(12) United States Patent
Shuster (10) Patent No.: US 7,757,298 B2
(45) Date of Patent: *Jul. 13, 2010

(54) METHOD AND APPARATUS FOR IDENTIFYING AND CHARACTERIZING ERRANT ELECTRONIC FILES

(76) Inventor: Gary Stephen Shuster, 2067 Manzanita Dr., Oakland, CA (US) 94611

( * ) Notice: Subject to any disclaimer, the term of this patent is extended or adjusted under 35 U.S.C. 154(b) by 1383 days.

This patent is subject to a terminal disclaimer.

(21) Appl. No.: 11/145,125

(22) Filed: Jun. 3, 2005

(65) Prior Publication Data

US 2005/0228795 A1  Oct. 13, 2005

Related U.S. Application Data

(63) Continuation of application No. 09/561,751, filed on Apr. 29, 2000, now Pat. No. 6,922,781.

(60) Provisional application No. 60/132,093, filed on Apr. 30, 1999, provisional application No. 60/142,332, filed on Jul. 3, 1999, provisional application No. 60/157,195, filed on Sep. 30, 1999.

(51) Int. Cl.
*G06F 7/04* (2006.01)
(52) U.S. Cl. ............................. 726/30; 726/26; 713/165
(58) Field of Classification Search .................. 726/22, 726/26, 30; 713/189, 165, 188
See application file for complete search history.

(56) References Cited

U.S. PATENT DOCUMENTS

| | | | | |
|---|---|---|---|---|
| 4,864,616 A | * | 9/1989 | Pond et al. | .................. 713/165 |
| 5,519,865 A | * | 5/1996 | Kondo et al. | .................. 707/1 |
| 5,530,757 A | * | 6/1996 | Krawczyk | .................. 713/188 |
| 5,809,138 A | | 9/1998 | Netiv | |
| 5,832,208 A | | 11/1998 | Chen et al. | |
| 5,835,722 A | * | 11/1998 | Bradshaw et al. | ........... 709/225 |
| 5,905,800 A | | 5/1999 | Moskowitz et al. | |
| 5,978,791 A | * | 11/1999 | Farber et al. | ................... 707/2 |
| 5,983,351 A | * | 11/1999 | Glogau | ........................ 726/26 |
| 5,996,113 A | * | 11/1999 | Korn et al. | .................. 714/807 |

(Continued)

FOREIGN PATENT DOCUMENTS

WO    WO9825373    *  6/1998

(Continued)

OTHER PUBLICATIONS

Kalker et al, "Music2Share—Copyright-Compliant Music Sharing in P2P Systems", IEEE, Jun. 2004, p. 961-960.*

*Primary Examiner*—Ponnoreay Pich
(74) *Attorney, Agent, or Firm*—Knobbe Martens Olson & Bear, LLP (57) ABSTRACT

A computer system includes a, server having a memory connected thereto. The server is adapted to be connected to a network to permit remote storage and retrieval of data files from the memory. A file identification application is operative with the server to identify errant files stored in the memory. The file identification application provides the functions of: (1) selecting a file stored in said memory; (2) generating a unique checksum corresponding to the stored file; (3) comparing said unique checksum to each of a plurality of previously generated checksums, wherein the plurality of previously generated checksums correspond to known errant files; and (4) marking the file for deletion from the memory if the unique checksum matches one of the plurality of previously generated checksums.

16 Claims, 6 Drawing Sheets

U.S. PATENT DOCUMENTS

| | | | |
|---|---|---|---|
| 6,081,897 A * | 6/2000 | Bersson | 726/32 |
| 6,182,081 B1 * | 1/2001 | Dietl et al. | 707/102 |
| 6,209,097 B1 * | 3/2001 | Nakayama et al. | 713/193 |
| 6,236,768 B1 * | 5/2001 | Rhodes et al. | 382/306 |
| 6,289,341 B1 * | 9/2001 | Barney | 707/6 |
| 6,510,513 B1 * | 1/2003 | Danieli | 713/156 |
| 6,530,022 B1 * | 3/2003 | Blair et al. | 713/186 |
| 6,577,920 B1 | 6/2003 | Hypponen et al. | |
| 6,643,696 B2 | 11/2003 | Davis et al. | |
| 6,922,781 B1 | 7/2005 | Shuster | |
| 7,120,274 B2 * | 10/2006 | Kacker et al. | 382/100 |
| 2002/0087885 A1 * | 7/2002 | Peled et al. | 713/201 |
| 2005/0108248 A1 * | 5/2005 | Natunen | 707/10 |

FOREIGN PATENT DOCUMENTS

| | | | |
|---|---|---|---|
| WO | WO9842098 | * | 9/1998 |

* cited by examiner

METHOD AND APPARATUS FOR IDENTIFYING AND CHARACTERIZING ERRANT ELECTRONIC FILES

RELATED APPLICATIONS

This application is a continuation of application Ser. No. 09/561,751 filed Apr. 29, 2000, now U.S. Pat. No. 6,922,781, which claims priority pursuant to 35 U.S.C. §119(e) to U.S. Provisional Application Nos. 60/132,093, filed Apr. 30, 1999; 60/142,332, filed Jul. 3, 1999; and 60/157,195, filed Sep. 30, 1999. All of the foregoing non-provisional and provisional applications are specifically incorporated by reference herein, in their entirety.

COPYRIGHT NOTICE

This patent document contains material subject to copyright protection. The copyright owner, Ideaflood, Inc., has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention relates to electronic files stored on computers, and more particularly, to methods and apparatus for identifying and characterizing errant electronic files stored on computer storage devices.

2. Description of Related Art

The use of public and shared computing environments has proliferated due to the popularity of the Internet. Many Internet service providers (ISP) offer Web hosting services at low or no cost in which registered users can place their own Web sites on the ISP's servers. These individual Web sites allow users to store and access electronic files that are uploaded to the servers. As a result of this proliferation, the administration of the large number of stored electronic files has become an important aspect of such Web hosting services. In view of the relative ease of public access to these electronic file storage resources, there is also widespread abuse of Web server space in which users upload files that are offensive, illegal, unauthorized, or otherwise undesirable and thus wasteful of storage resources. These file types are predominantly of four types: music, video, software and graphics. Many such files may contain pornography in violation of the terms of use of the Web hosting service. Moreover, the copying of these files to the Web server may be in violation of U.S. copyright laws. Consequently, the identification and removal of such files represents a significant administrative burden to the Web hosting services. In addition, the presence of certain files (such as depictions of child pornography or copyrighted music files) on user computers on corporate networks poses great legal risks to the corporation.

Such files can be selected for review and characterized as acceptable or unacceptable to the system administrator using an automated or manual process. Unfortunately, many undesirable files are not easily recognizable and cannot be detected and characterized. A manual review of the content of the files stored on the storage resource is usually not economically feasible, and is also not entirely effective at identifying undesirable files. Illicit users of Web hosting services have devised numerous techniques for disguising improper files wherein even easily recognizable file types are disguised as less recognizable file types. One such technique for disguising files is to split them into parts so that (i) they cannot be detected by simple searches for large files, and (ii) they can be downloaded or uploaded in smaller chunks so that if a transfer is interrupted, the entire download or upload is not lost. The split files may also be renamed so as to hide their true file type. For example, a search for oversized music files (*.mp3) would not turn up a huge file named "song.txt" because it appears to the system as a text file.

Another technique for hiding files is to append them to files that legitimately belong on a web server. By way of example, a Web site may be created called "Jane's Dog's Home Page." Jane gets ten small pictures of her dog, converts them to a computer readable format (for example, jpeg) and saves them on her computer. She then splits stolen, copyrighted software into ten parts. She appends each part to the end of one of the jpeg files. She then uploads these to a web server. Upon a manual review of the web page, the administrator of the site would not notice that the otherwise innocuous dog pictures actually contain stolen software, because each of the files would in fact display a photo of a dog. Thus, even if the files were reported for manual review by software doing a simple search for oversized files, the files would be left on the server because they appear to be legitimate. While these files can sometimes be identified by name or size alone, these methods lead to unacceptable numbers of false positives and false negatives as file sizes and names are changed.

Free and low cost web hosting services typically rely on advertising revenue to fund their operation. An additional abuse of these web hosting services is that they can be circumvented such that the advertisements are not displayed. Typically, the advertising content is displayed on text or hypertext pages. If a user stores graphics or other non-text files on a free web hosting server, yet creates a web page elsewhere on a different service that references these graphics or non-text files, the free web hosting service pays the storage and bandwidth costs for these files without deriving the revenue from advertisement displays.

A need exists, therefore, to provide a method and apparatus for identifying and characterizing errant electronic files stored on computer storage devices, that makes use of a variety of file attributes to reliably characterize files according to pre-set criteria, that is not easily circumvented, and that reduces the amount of manual review necessary to verify proper operation.

SUMMARY OF THE INVENTION

In accordance with the teachings of the present invention, a method and apparatus are provided for identifying and characterizing files electronically stored on a computer storage device. More particularly, an embodiment of the invention further comprises a computer system that includes a server having a memory connected thereto. The server is adapted to be connected to a network to permit remote storage and retrieval of data files from the memory. A file identification application is operative with the server to identify errant files stored in the memory. The file identification application provides the functions of: (1) selecting a file stored in said memory; (2) generating a unique checksum corresponding to the stored file; (3) comparing said unique checksum to each of a plurality of previously generated checksums, wherein the plurality of previously generated checksums correspond to known errant files; and (4) marking the file for deletion from the memory if the unique checksum matches one of the plurality of previously generated checksums.

A more complete understanding of the method and apparatus will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a method and apparatus for identifying and characterizing errant electronic files stored on computer storage devices, that makes use of a variety of file attributes to reliably characterize files according to pre-set criteria, that is not easily circumvented, and that reduces the amount of manual review necessary to verify proper operation. In the detailed description that follows, like element numerals are used to describe like elements illustrated in one or more of the figures.

Figure 1:
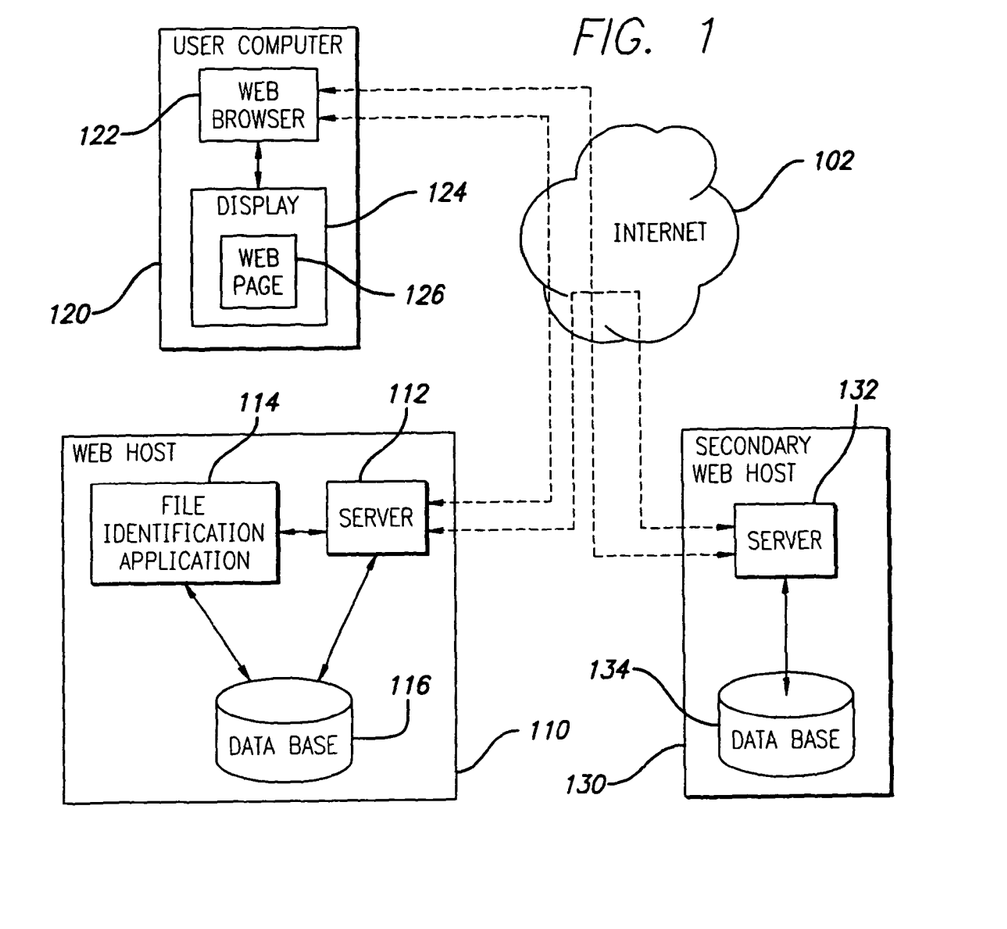
FIG. 1 is a block diagram illustrating a wide area network in which a web host delivers information in the form of web pages to users.

Referring first to FIG. 1, a block diagram is illustrated of a wide area network in which information is delivered to users in the form of web pages. It is anticipated that the present system operates with a plurality of computers that are coupled together on a communications network, such as the Internet or a wide area network. FIG. 1 depicts a network that includes a user computer 120 that communicates with a Web host 110 though communication links that include the Internet 102. The user computer 120 may be any type of computing device that allows a user to interactively browse websites, such as a personal computer (PC) that includes a Web browser application 122 executing thereon (e.g., Microsoft Internet Explorer™ or Netscape Communicator™). The Web host 110 includes a server 112 that can selectively deliver graphical data files in the form of HyperText Markup Language (HTML) documents to the user computer 120 using the HyperText Transport Protocol (HTTP). Currently, HTML 2.0 is the standard used for generating Web documents, though it should be appreciated that other coding conventions could also be used within the scope of the present invention. The server 112 accesses HTML documents stored within a database 116 that can be requested, retrieved and viewed at the user computer via operation of the Web browser 122. The database 116 may also contain many other types of files, including text, graphics, music, and software files. It should be appreciated that many different user computers may be communicating with the server 112 at the same time.

As generally known in the art, a user identifies a Web page that is desired to be viewed at the user computer 120 by communicating an HTTP request from the browser application 122. The HTTP request includes the Uniform Resource Locator (URL) of the desired Web page, which may correspond to an HTML document stored on the database 116 of the Web host 110. The HTTP request is routed to the server 112 via the Internet 102. The server 112 then retrieves the HTML document identified by the URL, and communicates the HTML document across the Internet 102 to the browser application 122. The HTML document may be communicated in the form of plural message packets as defined by standard protocols, such as the Transport Control Protocol/Internet Protocol (TCP/IP). A user may also download any other type of file from the database 116 in the same manner.

FIG. 1 further illustrates a secondary Web host 130 having a server 132 and database 134 similar to that of the primary Web host 110. The user computer 120 can communicate with the secondary Web host 130 in the same manner as described above. Moreover, the primary Web host 110 can communicate with the secondary Web host 130 in the same manner. The pertinence of this communication path will become more clear from the following description of the present method. The Web host 110 further comprises a file identification application 114 that analyzes the data files stored on the database 116 in order to identify errant files in accordance with the present invention. The file identification application 114 may comprise a program executing on the same computer as the server 112, or may be executing on a separate computer. The file identification application tests various attributes of the files stored on the database to determine whether they satisfy a particular profile that corresponds to an errant file. Source code for a preferred embodiment of a file identification application is attached hereto as an exhibit.

A widely accepted characteristic of the Internet is that files are copied relentlessly and without permission. This is particularly true of illicit files, such as adult content, pornographic material or illegally copied software, music or graphics. Thus, a photograph showing up on a single Web site may be propagated to hundreds of other Web sites within days. Although the file name is often changed, and transmission errors often result in premature truncation of the file (and thus a new file length), the initial portion of the file remains identical as it is propagated throughout the Internet. Another characteristic of the Internet is that illicit files, such as music, video and software, all have one common attribute—they are very large once reassembled. It is therefore necessary to (i) identify oversized files that have been uploaded in parts, and (ii) identify "hidden" files that are appended to otherwise legitimate files. As will be further described below, an aspect of the present invention takes advantage of these characteristics of the Internet.

Figure 2A:
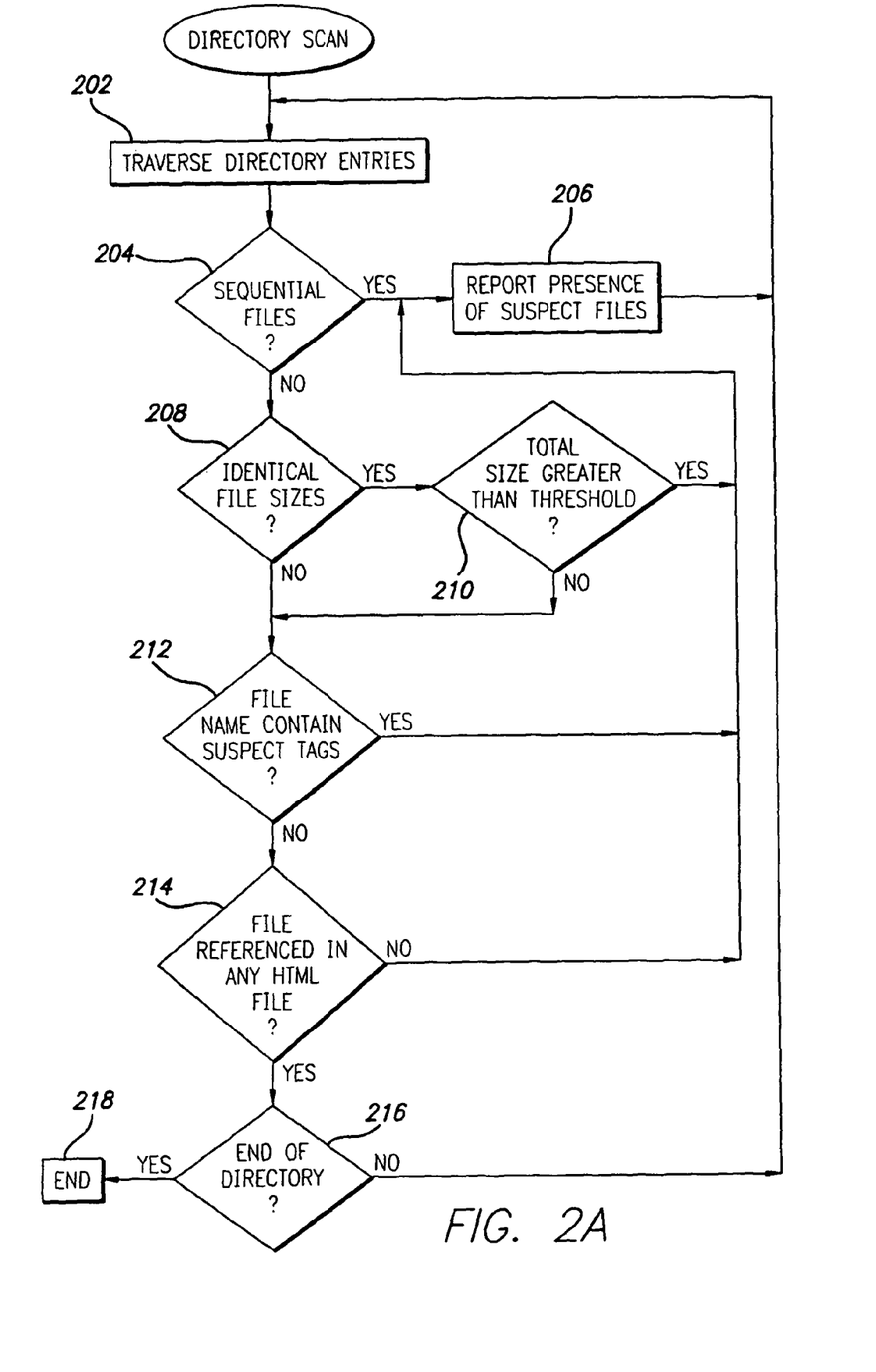
FIG. 2A is a flow chart illustrating a method of scanning a file directory to identify suspect files stored in a database in accordance with an embodiment of the invention.
Figure 2B:
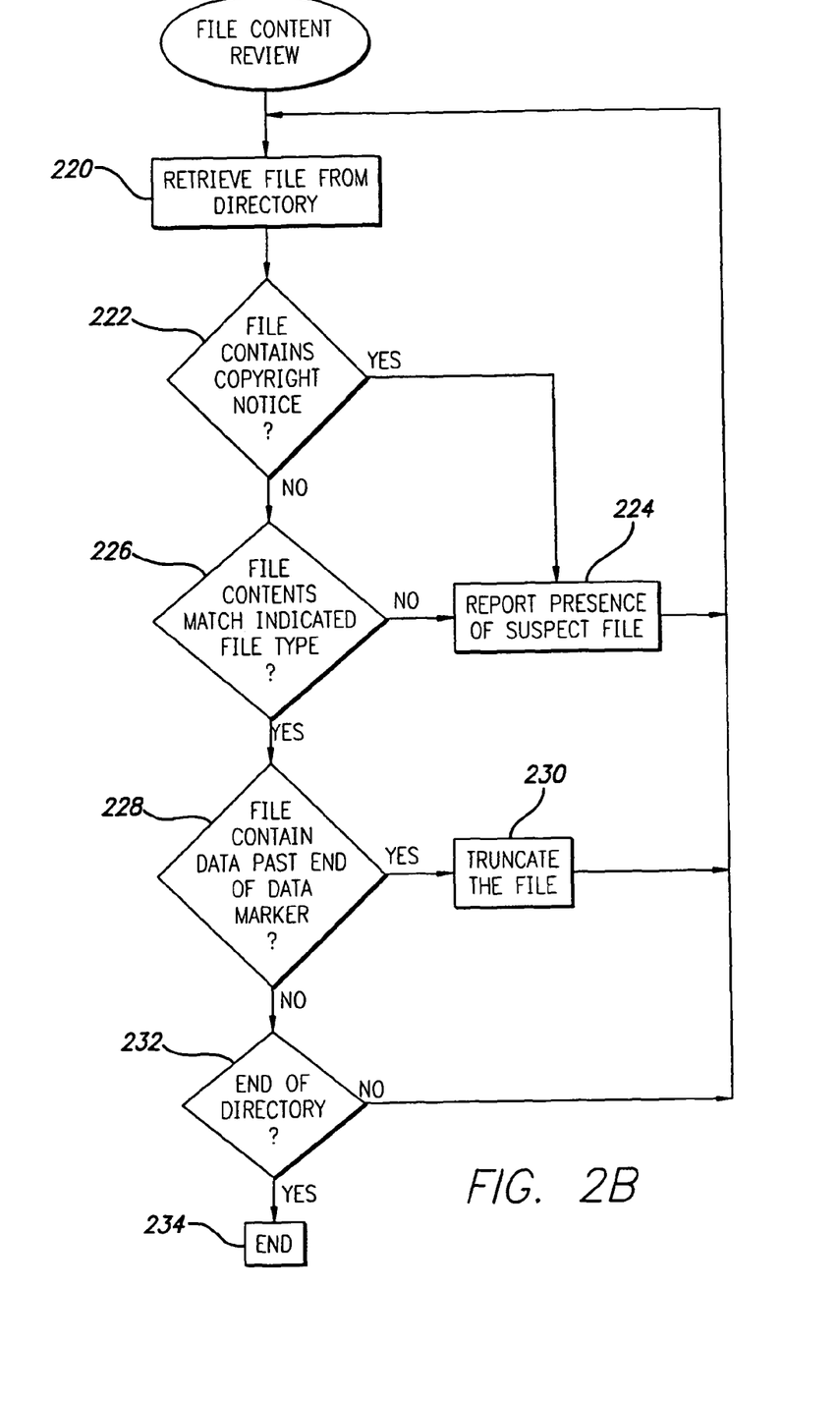
FIG. 2B is a flow chart illustrating a method of reviewing file contents to identify suspect files.
Figure 2C:
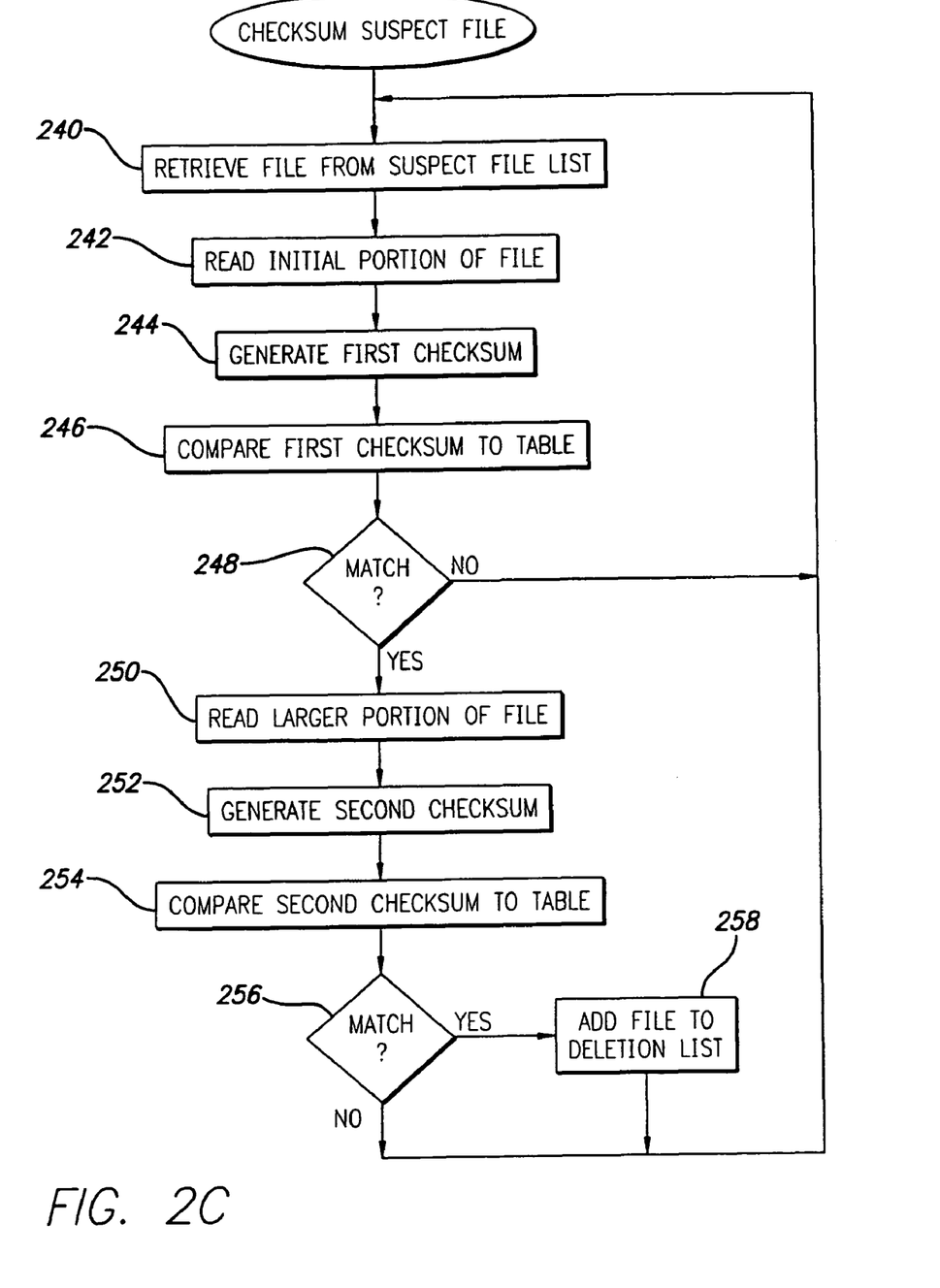
FIG. 2C is a flow chart illustrating a method of checksumming the suspect files.

Referring now to FIGS. 2A-2C, a method for identifying and characterizing files is illustrated in accordance with an embodiment of the invention. The method would be executed by the file identification application 114 described above with respect to FIG. 1. FIG. 2A illustrates an exemplary method of scanning a file directory to identify suspect files stored in a database. Suspect files are ones that are suspected of being improper, and are marked for further testing. The database 116 includes a directory that identifies the files stored therein based on various attributes, including file name and file size. It will be appreciated from the following discussion that the method of FIGS. 2A-2C relates specifically to the identification of pornographic materials in view of the particular selection criteria that is utilized; however, it will be understood to persons of ordinary skill in the art that the selection criteria can be modified to identify other types of illicit files. Starting at step 202, the application traverses the directory in order to analyze the numerous directory entries. The application may construct a relational database of the directory entries in order to sort on the various fields of the directory. This step may be performed repeatedly as a continuing process through this identifying process, and would have to be repeated periodically to identify new files that are added to the database 116.

At step 204, the application determines whether there are any sequentially numbered files within the directory. Sequential files can be identified by analyzing and comparing the file names to each other. One attribute of pornographic materials is that they are often uploaded to a server as part of a series of photographs. Thus, the file names may include an embedded numerical designation such as "xxx001.jpg" or "xxx002.jpg". The user may define at what level of folders the software will look for sequentially numbered, lettered, or otherwise identified files. For example, if a file server is divided into folders lettered from "AA" to "ZZ", and each folder contains Web sites with names in which the first two letters correspond to the name of the file folder, the user could decide to treat all folders on the server as a single Web site, or to treat only Web sites within the same folder as a single Web site, or to treat each Web site individually. In the preferred embodiment, each Web site is considered on its own without reference to other Web sites, although the invention need not be limited in this manner.

If any such sequential files are identified, they are reported as suspect files at step 206. Then, the application returns to step 202 and continues traversing through the directory entries. If no sequential files are identified at step 204, the application next determines at step 208 whether there are any files having identical file sizes. Another attribute of stolen intellectual property materials such as music files is that they are often broken up into several pieces in order to thwart their detection by simple searches for large files, and also to enable them to be downloaded or uploaded in smaller chunks to facilitate transfer. The presence of two or more files having identical file size within the, directory is an indicator that they may be pieces of a single, larger, illicit file. If there are plural files with identical file sizes, the application determines at step 210 whether the total size of the identical files summed together would exceed a predetermined threshold. As noted above, illicit files tend to be unusually large, so the predetermined threshold would be selected to correspond with the largest size of a typical non-illicit file. If the total size does exceed the predetermined threshold, then the identical files are reported as suspect files at step 206.

More particularly, the application may manipulate the file names to determine whether they are in fact likely to be parts of a single, larger file. An alternative way to determine whether files should be aggregated is to delete all numbers from the file names. Any files that are identically named after the elimination of all numbers would be marked as potentially responsive and their names and aggregate size would be reported. Of course, this can be limited to numbers in conjunction with specified letters (such as r00, r41, etc., as the "r" denotation often indicates file compression and division via the RAR method). Similarly, this can be limited to specified file types (whether identified by the file type suffix to the file name, or by examination of the actual contents of the file) or files other than specified types (for example, legitimate graphics files such as *.jpg are often sequentially numbered and may be a good candidate for exclusion). Next, using the original list of file names, any files are identified that differ only by a user-defined number of characters. Such files would be marked as potentially responsive and their names and aggregate size would be reported. Both of the foregoing methods can be set to either ignore the file suffix or file type information or to utilize it. Next, using the original list of file names and sizes, files that are of the same size (or within a user-defined number of bytes of being of the same size) are identified. Any such files are marked as potentially responsive and their names and aggregate size would be reported.

If no identical files are identified at step 208, or if the total size does not exceed the predetermined threshold at step 210, the application proceeds to step 212 where it is determined whether the file names contain any suspect tags. An example of a suspect tag is "xxx" which is often used in association with pornographic materials. Another example of a suspect tag is "crc", which refers to a cyclical redundancy check (CRC), i.e., a known error checking technique used to ensure the accuracy of transmitting digital data. When a large file has been broken up into plural smaller files, it is common to include a CRC file in order verify the accurate reconstruction of the large file. The presence of a file having a "crc" tag is an indicator that an illicit or illegal file has been uploaded to the server. A table of predetermined suspect tags may be generated and periodically updated to reflect current usage within Internet newsgroups, Web sites and other facilities for trafficking in pornographic or illicit materials. If any file names containing suspect tags are identified, then the associated files are reported as suspect files at step 206.

If no suspect tags are identified at step 212, the application proceeds to step 214 where it is determined whether the file is referenced in any HTML file contained within the directory. Ideally, the files stored on the database would each be linked to HTML files contained within the directory. Where a file is not linked to a local HTML file, this is an indicator that a user is storing graphics or other non-text files that are linked to a Web page hosted elsewhere on a different service. As described above, this situation is undesirable since the free web hosting service pays the storage and bandwidth costs for these files without deriving the revenue from advertisement displays. Accordingly, any file names that are not referenced in an HTML file contained within the directory are reported as suspect files at step 206. Alternatively, every file bearing a file type capable of causing a web browser to generate hypertext links (i.e. *.htm, *.html, *.shtml, etc.) may also be reviewed. The hypertext links may be then compared against a list of illegal links (for example, links to adult-content Web sites). Any file that contains a hypertext link to such a site is reported as suspect. If all files on the directory are properly referenced in HTML files or contain no illegal links, the application determines whether the end of the directory has been reached at step 216. If the end of the directory is not yet reached, the application returns to step 202 to continue traversing the directory and identifying suspect files. Otherwise, this portion of the application ends at step 218.

Once a review of the directory entries is complete, the next step is to review the content of the files listed on the directory to see if additional files should be added to the suspect file list. This review may address every file listed on the directory not already listed on the suspect file list, or may be further narrowed using particular selection criteria specific to the type of illicit file, i.e., pornography, copyright infringement, etc. FIG. 2B illustrates an exemplary method of reviewing file contents. At step 220, the application retrieves a file from the directory. At step 222, the retrieved file is examined to identify whether the file contains a copyright notice or the symbol ©. The presence of a copyright notice in the file is an indicator that the file has been uploaded to the server unlawfully, and likely contains graphics, text, software or other material that is protected by copyright. Any files containing the copyright notice would be reported as a suspect file and added to the suspect file list at step 224. This copyright notice check procedure can also be used to ensure compliance with appropriate copyright laws. Alternatively, the file can be simply marked for deletion. The application then returns to step 220 and retrieves the next file.

If the file does not contain a copyright notice, the application passes to step 226, in which the retrieved file is examined to determine whether the file structure is as expected for a file of the indicated type. For example, the file type "jpg" should contain a header structure with the values "255 216 255 224". Alternatively, files can be checked to ensure that they actually contain the type of data described by the file type marker (i.e., a file named *jpg should contain a jpg image). If the file does not match the indicated file type, the file can be reported as a suspect file and added to the suspect file list at step 224, or simply marked for deletion. Another alternative approach would be to replace files containing data of a type different than that indicated by their file type marker by a file stating that the original file was corrupted. Yet another approach would be to retype the file (i.e. *jpg can be retyped to *.zip if it contained a zipped file and not a jpg). Further, certain file types can be aggregated. For example, *.gif and *.jpg files may be aggregated as a single file type, and a file bearing a *.jpg type is considered valid if it contains either a gif or a jpg image. This greatly reduces the problem of mistakenly deleting a file that a consumer has innocently misnamed. The application then returns to step 220 and retrieves the next file.

If the file contents do match the indicated file type, the application determines at step 228 whether the file contains data extending past the end of data marker. If this marker appears before the true end of file, then it is likely that the additional data following the end of data marker constitutes a portion of an illicit file. At step 230, the file is truncated at the end of file marker. The application then returns to step 220 and retrieves the next file. If the file does not contain data past the end of data marker, the application proceeds to step 232 in which it is determined whether the end of the directory has been reached. If there are still additional files in the directory to review, the application returns to step 220 and retrieves the next file. If there are no additional files, the file content review process ends at step 234.

After the files within the directory have been reviewed and a list of suspect files generated, the next step is to checksum the suspect files and compare the results against a library of checksum values corresponding to known illicit files. The generation of this list of known illicit files will be described below with respect to FIG. 4. FIG. 2C illustrates an exemplary method of checksumming the suspect files. A checksum is a unique number based upon a range or ranges of bytes in a file. Unlike checksums as they are traditionally used in the computing field, the checksum described herein is not related to the total number of bytes used to generate the number, thus reducing a traditional problem with checksums, namely that similar file lengths are more likely to generate the same checksum than are dissimilar file lengths. In a preferred embodiment of the invention, two separate checksums are generated for a file corresponding to two different length portions of the file. While it is possible that the first checksum based on a shorter length portion of the file may falsely match the checksum of another file, it is highly unlikely that the second checksum would result in a false match. In addition, the use of an initial checksum based upon a small amount of data, reduces the burden on the network and file server. This reduction is a result of the ability to disqualify a file that does not match the first checksum without the need to read the larger amount of data necessary to generate the second checksum.

More particularly, at step 240, the application retrieves a file from the database identified on the suspect file list. Then, at step 242, the application reads a first portion of the suspect file. In an embodiment of the invention, the first portion comprises the first one-thousand (1,024) bytes of the file. A first checksum based on this first portion is generated at step 244. The first checksum is then compared to a library of known checksum values at step 246, and at step 248 it is determined whether there is a match between the first checksum and the library. This step provides an initial screen of a file. If there is no match, then the file likely does not correspond to a known illicit file. The file may nevertheless constitute improper or unlawful material, and it may therefore be advisable to manually review the file to evaluate its contents. If the file does contain improper or unlawful material, its checksum may be added to the library of known checksums and the file marked for deletion from the database. Conversely, if the manual review does not reveal the file to be improper or unlawful, or based simply on the negative result of the first checksum comparison, the file is removed from the suspect file list, and the application returns to step 240 to retrieve the next file from the suspect file list.

If there is a match based on the initial screen of the file, the application proceeds to step 250 in which a second portion of the file is read. In an embodiment of the invention, the second portion comprises the first ten-thousand (10,240) bytes of the file. A second checksum based on this second portion is generated at step 252. The second checksum is then compared to a library of known checksum values at step 254, and at step 256 it is determined whether there is a match between the second checksum and the library. This step provides a more conclusive determination as to whether the file corresponds to a known improper or unlawful file. If there is a match, the file is marked for deletion (or other treatment) at step 258, and the application returns to step 240 to retrieve the next suspect file. If there is not a match, the file is removed from the suspect file list, and the application again returns to step 240 to retrieve the next suspect file.

The files that are marked for deletion may be listed along with the pertinent information in a database (either via numerous individual files, an actual database such as SQL Server, or otherwise). This database may be manually reviewed and files that should not be deleted removed from the database. A simple file deletion program may then be run that deletes any file in the database.

As noted above, the first one-thousand bytes and the first ten-thousand bytes are used for the two checksums, respectively. For most applications, the use of the entire file or a larger portion of the file is not necessary and indeed may slow the process; however, there is no reason why the entire file or any other subset of the file could not be used. In an alternative embodiment, the first and last portions of the file are used for checksumming, although premature file truncation then becomes a way to defeat the screen. It is also possible to use other data to improve the quality of the initial screen, such as the length of the file and the file name. Any file matching the initial screen criteria is then checked against one or more checksum tests. Yet another alternative embodiment is to simultaneously generate both the initial screen checksum and the confirmation checksum in a single file read, thereby reducing the number of distinct disk access events. Verification is optional when the initial screen is performed using a checksum, as the checksum denotes a nearly certain match.

In an alternative embodiment of the invention, the present method for identifying and characterizing files can be used to block music piracy on the Internet. Each music CD carries certain identifying data that permits unique identification of that CD. MP3 encoders can be configured to encode this information into the first bytes of each MP3 file. As such, the MP3 file would carry the signature of the music CD it was created from. This would permit a scan of all files on a server for the signature code of a particular CD. When such a code is found, it can be checked against a database of copyrighted music and any matches marked for deletion and/or review. An alternative embodiment would be to prevent MP3 players from working property unless the unique identifier from a CD is found, and that unique identifier can be checked for validity against a checksum or an Internet database.

Figure 3:
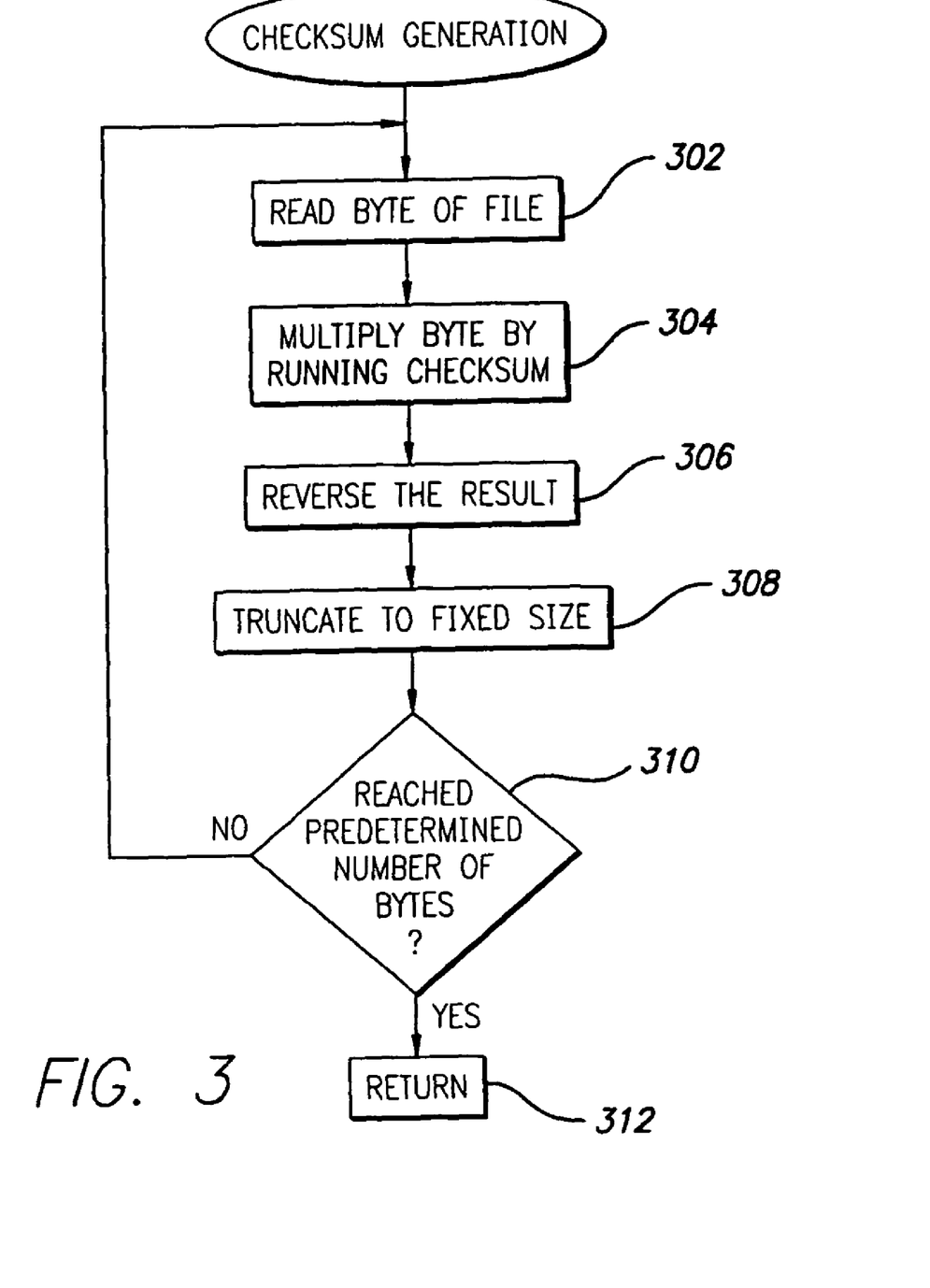
FIG. 3 is a flow chart illustrating a method of generating checksum values.

There are numerous possible algorithms that may be utilized to generate a checksum, with an exemplary algorithm shown in FIG. 3. At step 302, a single byte of the file is read. The byte is then multiplied by the current value of the checksum at step 304. On the first pass through the algorithm, a value of one is used for the current value of the checksum. Next, at step 306, the result of the previous step is reversed (e.g., 1234 becomes 4321). At step 308, the result of the previous step is truncated to a predetermined number of digits (e.g., with the predetermined number of digits being nine, 1,234,567,890 becomes 123,456,789). At step 310, the algorithm determines whether the predetermined number of bytes has been reached. As described above, checksums are performed using the first one-thousand (1,024) and ten-thousand (10,240) bytes in accordance with a preferred embodiment of the invention. If the predetermined number of bytes has not been reached, the algorithm returns to step 302 and continues with the next byte. Conversely, if the predetermined number of bytes has been reached, the algorithm ends at step 312. An advantage of this algorithm is that the checksum that is generated is independent of the number of bytes that are utilized. This way, the likelihood of false matches is substantially reduced even though the same number of bytes are used to calculate the checksums.

It should be appreciated to persons having ordinary skill in the art the many other types of algorithms could be utilized to achieve results specific to certain types of files. In an alternative embodiment of the invention, checksums of graphics files may be generated based on vector graphics analysis of the files. The graphics file may be reduced to its vector graphics components. The resulting vector graphics image is then reduced to a checksum representing the vector graphics image. The checksum is then checked against a list of checksums generated in a similar matter against known or suspected inappropriate images.

An alternative method of generating a unique checksum for a graphics file is by dividing an image into quadrants or other blocks and comparing the relationships between the zones into which the image is divided. For example, the relative ratio of red to green, green to blue, and blue to red in each of the zones may be calculated, and then recorded. A file could then be altered in a minor way (such as by altering several bits) without defeating the ability of the software to find the file.

Figure 4:
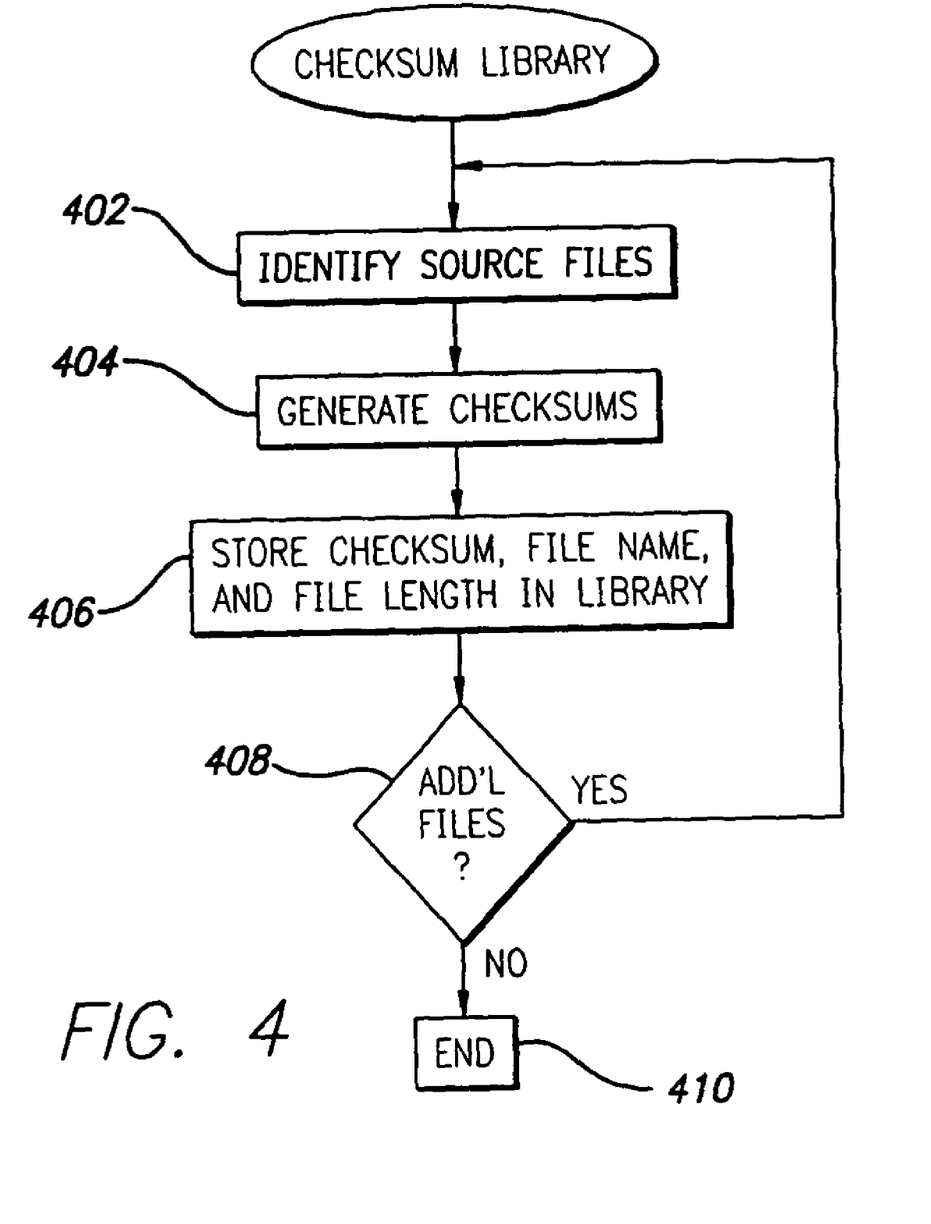
FIG. 4 is a flow chart illustrating a method of generating a checksum library.

Referring now to FIG. 4, an exemplary process is illustrated for generating the library of checksum values. At step 402, a source of known illicit files is identified. This may be performed by manually reviewing files already stored on the database 116 of the Web host 110, such as the files identified as suspect (see FIGS. 2A-2B). Alternatively, sources of illicit files outside of the Web host 110 may be sought, such as located on a secondary Web host 130. Certain Web servers may be assumed to contain files matching the criteria (i.e., a Web host that accepts adult content and runs adult oriented ads over that content will contain nearly entirely adult material). Alternatively, a target newsgroup (e.g., alt.binaries.pictures.erotica.female) can provide a source of illicit files. Once an adequate source of files is identified, checksum values are generated at step 404 in the same manner as described above with respect to FIG. 3. Then, at step 406, the checksum is stored in a library along with the file name and file length. Lastly, at step 408, it is determined whether there are other files associated with the identified source of files that can be checksummed in order to further enlarge the library. As will be further described below, the identification of a single source of illicit material will invariably lead to other sources of material. Thus, the library can be expanded at an exponential rate. The process of FIG. 4 is repeated for each new source of illicit material. If no additional source files can be located, the process terminates at step 410.

Once a single file is located matching a predefined criteria (i.e., adult content), it is almost certain that other files also matching the same criteria will be found together with or in proximity to the original matching file (e.g., a Web site having one pornographic photograph will likely contain others with it). All files located with the matching file can be automatically checksummed, or can be checksummed after a manual review. Thus, the library of checksums is expanded. In view of the nature and prevalence of illicit material on the Internet, it is also likely that the matching files will also appear on other Web sites, and will thus lead to other files meeting the selection criteria that can themselves be checksummed. The expansion of the checksum library is thus exponential, and nearly the entire body of illicit materials on the Internet can be checksummed in this manner. This checksum amplification method in the automated checksumming modality can be further refined by requiring that any given checksummed file appear together with a minimum number of other checksummed files on a minimum number of Web sites before the file represented by the checksum is considered to match the selection criteria.

It should be appreciated that one cannot defeat the present invention by simply altering an illicit image file. Although the alteration of an image file may prevent it from matching an existing checksum, the altered image will invariably be copied and posted on a new Web site together with unaltered, checksummed images, and will be inevitably checksummed using the foregoing process. Furthermore, the process can be modified so as to allow automated checksumming with a greatly reduced risk of the generation of checksums for files that do not match the selection criteria. One approach is to set a file size floor and ceiling and/or file type limitation. Another approach is to create and maintain a list of excluded files, including all publicly available "clip art" and popular mainstream advertising banners, as well as files that show up frequently on legitimate Web sites. Yet another alternative approach is to require an image to appear in proximity to known illicit files, such as files that match existing checksums, a minimum number of times before being added to the checksum library.

Furthermore, certain graphics are quite common in certain types of Web sites. For example, pornographic Web sites almost always contain a "banner" advertising membership in a commercial pornography Web site. There is a very limited universe of such banners. By generating checksums for all available pornographic banners, it is possible to locate nearly all pornographic web sites. Using the checksum amplification method described above, these advertising banner checksums would quickly lead to a very comprehensive catalog of pornographic material checksums. Similarly, illegally copied software sites often have "warez" banners. Other target file types have banners and common graphics associated with them as well.

Files matching the selection criteria can also be located by searching for hyperlinks to checksummed files or to sites known to contain inappropriate material. Thus, whenever a checksum is matched, the URL of the material located is recorded. Any HTML page that links to that material is then identified as likely containing material matching the selection criteria. All other graphics referenced by that HTML page and/or in the same Web site may then be automatically checksummed or flagged for manual review and checksumming.

Certain key words may also be searched for on a Web site. Thus, for example, the word "fuck" in close association with "lolita" should flag a site as likely to contain child pornography. This method is better used in conjunction with a manual review so as to avoid checksumming files that do not match the selection criteria, although it can also be used as an enhancement to the checksum amplification method to confirm that checksums should be automatically generated.

The results of these searches can be returned in a regular text file. Alternatively, the results may be returned in a formatted HTML file that interconnects with the file management system. The HTML file should display a copy of all files on a given Web site matching the checksum(s), all user information as well as other sites using the same password, with the same user name, with the same IP address, or the same e-mail address, and the options to delete the site(s), modify the records, delete the materials, etc. Furthermore, for those file types that cannot be graphically displayed by a Web browser, the "server" modality (see code attached as Exhibit) should be used to return a "file present" or "file absent" graphic to indicate whether the file is present or absent.

In an alternative embodiment of the invention, the present method for identifying and characterizing files may be implemented in a real-time manner to review files as they are uploaded to the Web server. In yet another embodiment of the invention, the present method for identifying and characterizing files may be used to check the contents of desktop computers within a business. Thus, for example, with file and access permissions set correctly, the software could determine whether pornography, child pornography, copyrighted software, or other problematic materials exist on the computers used by employees. Appropriate reporting could then be accomplished. This can also be accomplished by running the software in a standalone package on desktop computers (by parents, for example). For file systems that require locally running software, the software can also be combined with necessary software (for example, the detection software could also serve as the e-mail program for the user, or as the mechanism whereby the user logs into their main server).

An important advantage of the use of checksums to identify and characterize illicit files is that the customer service employees of a Web hosting company can determine with certainty that a file contains illegal contents without actually viewing the file. This is particularly important in retaining employees, as many individuals can become uncomfortable or disturbed by having to view illicit, violent or illegal images. For example, by having a library of child pornography checksums, the computer can simply report "child porn found", and no employee need ever see the image. The customer service employees can then load the illegal file onto a disk to deliver to law enforcement, and terminate the customer account. Another advantage of using the checksums is that it eliminates the need for the Web hosting company to maintain copies of illegal or contraband files in order to verify that files match them. Thus, it is unnecessary to keep a copy of an illegal picture or stolen music file in order to check whether files found on the server match the illicit files.

Lastly, the present method for identifying and characterizing files could be used to provide automatic notification to Web host customers and other interested parties. Any time a file is reported as illegal, a database containing a list of customer data may be accessed to obtain the e-mail address of the site operator. An automated e-mail message may be generated (optionally copied to the Web hosting company's staff) indicating that the site has been marked for review and/or deletion. Alternatively, the fax number of the customer may be accessed and the same message sent via fax. Alternatively, the phone number may be accessed and a text-to-voice system used to send an automated telephone message. Alternatively, postal mail may be printed with the customer's address and the same message.

Having thus described a preferred embodiment of a method and apparatus for identifying and characterizing errant electronic files, it should be apparent to those skilled in the art that certain advantages have been achieved. It should also be appreciated that various modifications, adaptations, and alternative embodiments thereof may be made within the scope and spirit of the present invention. The invention is further defined by the following claims.

What is claimed is:

1. A computer-implemented method for identifying and characterizing stored electronic files, said method comprising:

under control of one or more configured computer systems:
selecting a file from a plurality of files stored in a computer storage medium, wherein selecting the file is performed according to at least one of:
selecting the file based on the size of the file by determining whether an aggregate size of plural identically-sized files exceeds a predetermined threshold;
selecting the file based on whether content of the file matches a file type indicated by a name of the file; or
selecting the file based on whether the file comprises data beyond an end of data marker for the file;
generating an identification value associated with the selected file, wherein the identification value is representative of at least a portion of the content of the selected file;
comparing the generated identification value to one or more identification values associated with one or more of a plurality of unauthorized files; and
characterizing the file as an unauthorized file if the identification value matches one of the plurality of identification values associated with the unauthorized files.

2. The computer-implemented method of claim 1, further comprising selecting the file from one of a plurality of sequentially-ordered files in a directory of the computer storage medium.

3. The computer-implemented method of claim 1, wherein generating an identification value comprises generating a checksum.

4. The computer-implemented method of claim 3, wherein-generating an identification value comprises generating a first checksum corresponding to a first portion of said stored file and a second checksum corresponding to a second portion of said stored file.

5. The computer-implemented method of claim 3, wherein generating an identification value comprises generating a first checksum corresponding to a first portion of said stored file and a second checksum corresponding to a larger portion of said stored file that includes the first portion.

6. The computer-implemented method of claim 1, further comprising processing a plurality of known unauthorized files to generate the plurality of identification values.

7. The computer-implemented method of claim 1, further comprising presenting the identified unauthorized file for human review prior to disposing of it.

8. The computer-implemented method of claim 1, further comprising automatically notifying a third party that the file has been identified.

9. The computer-implemented method of claim 1, further comprising deleting the identified unauthorized file from the computer storage medium.

10. A computer system, comprising:
- a server having a memory connected, thereto, said server being adapted to be connected to a network to permit remote storage and retrieval of data files from the memory; and
- a file identification application operative with the server to identify unauthorized files stored in the memory, the file identification application providing the functions of:
    - selecting a file from a plurality of files stored in the memory, wherein selecting the file is performed according to at least one of:
    - selecting the file by determining whether an aggregate size of plural identically-sized files exceeds a predetermined threshold;
    - selecting the file based on whether content of the file matches a file type indicated by a name of the file; or
    - selecting the file based on whether the file comprises data beyond an end of data marker for the file;
    - generating an identification value associated with the selected file, wherein the identification value is representative of at least a portion of the content of the selected file;
    - comparing the generated identification value to one or more identification values associated with one or more of a plurality of unauthorized files; and
    - characterizing the file as an unauthorized file if the identification value matches one of the plurality of identification values associated with the unauthorized files.

11. The system of claim 10, wherein the application further comprises the function of selecting the file from one of a plurality of sequentially-ordered files in a directory of the computer storage medium.

12. The system of claim 10, wherein the application further comprises the function of selecting the file from a plurality of files stored in the computer storage medium, based on size of the file.

13. The system of claim 10, wherein generating an identification value comprises generating a checksum.

14. The system of claim 13, wherein generating an identification value comprises generating a checksum corresponding to a first portion of the selected file and a second checksum corresponding to a second portion of the selected file.

15. The system of claim 13, wherein generating an identification value comprises generating a first checksum corresponding to a first portion of the selected file and a second checksum corresponding to a larger portion of the selected file that includes the first portion.

16. A non-transitory computer-readable storage medium having instructions stored thereon that, in response to execution by a computing device, cause the computing device to perform a operations comprising:
- selecting a file from a plurality of files stored in a computer storage medium, wherein selecting the file is performed according to at least one of:
    - selecting the file based on the size of the file by determining whether an aggregate size of plural identically-sized files exceeds a predetermined threshold;
    - selecting the file based on whether content of the file matches a file type indicated by a name of the file; or
    - selecting the file based upon whether the file comprises data beyond an end of data marker for the file;
- categorizing the selected file as an unauthorized file based on a comparison of an identification value associated with the selected file with one or more identification values associated with one or more of a plurality of unauthorized files.

* * * * *